UNITED STATES PATENT OFFICE.

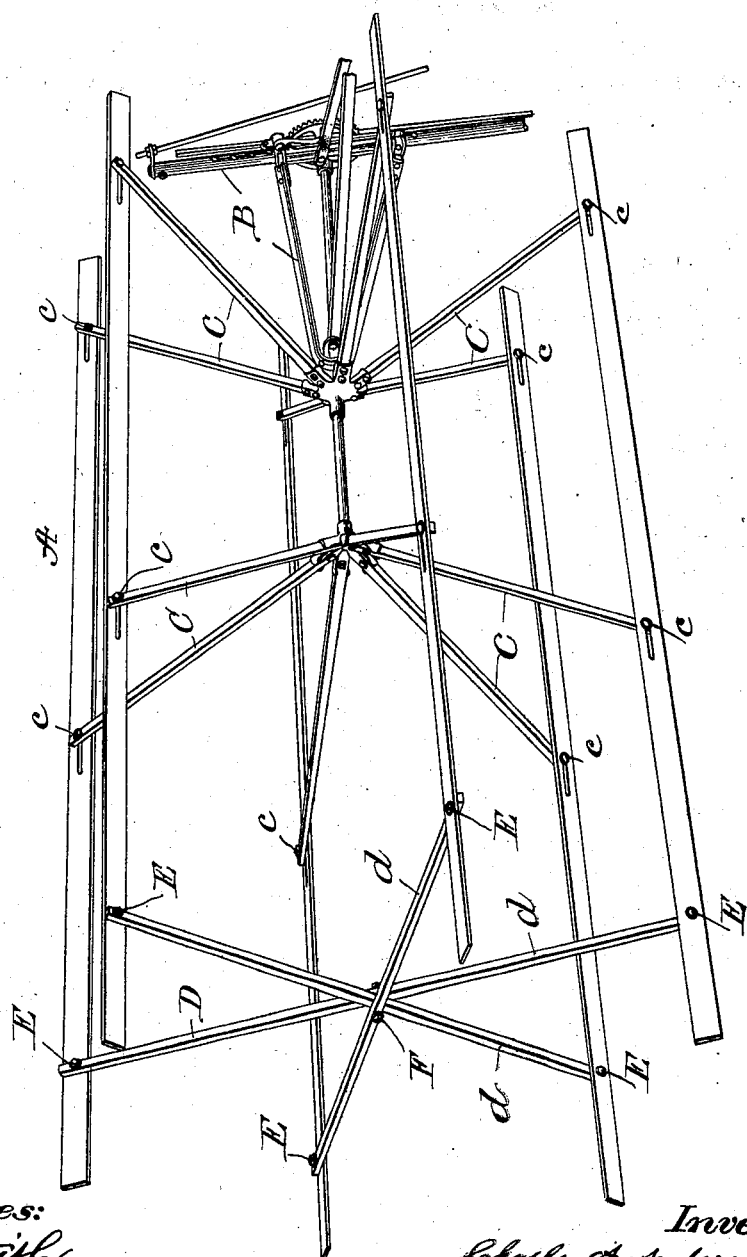

CHARLES A. ANDERSON RAND, OF CHICAGO, ILLINOIS, ASSIGNOR TO DEERING HARVESTER COMPANY, OF CHICAGO, ILLINOIS.

HARVESTER-REEL.

SPECIFICATION forming part of Letters Patent No. 700,236, dated May 20, 1902.

Application filed January 6, 1902. Serial No. 88,700. (No model.)

*To all whom it may concern:*

Be it known that I, CHARLES A. ANDERSON RAND, of 18 Fullerton avenue, in the city of Chicago, county of Cook, and State of Illinois, have invented certain new and useful Improvements in Harvester-Reels, of which the following is a full description, reference being had to the accompanying drawing.

My invention relates to improvements in reels for harvesting-machines, and has for its object certain improvements in the construction of the said reel whereby it is strengthened and braced and each slat or bar contributes to the support of another or all of the other slats or bars jointly.

In the construction of reels of the overhung type only a comparatively short shaft is used in order to avoid overhung weight. The reel-arms instead of extending therefrom at right angles have been placed upon said shaft so as to extend angularly rearward, thus reaching out and supporting the slats or bars at a point as near to their ends as possible. However, there still remained on account of the slats being so light, and consequently resilient, a great necessity for an absolute stiffness at the ends. I attain this object by the construction and arrangement illustrated in the accompanying drawing, which is a perspective view of a reel provided with my system of braces as viewed from a rear stubbleward position.

A is the reel, provided with my improved brace or stiffening device $b$.

D is the reel-supporting post and frame.

The parts lettered C are the usual reel-arms, to which are attached the slats by a bolt $c$, passing through a slot in the said slats for the purpose of adjusting the same endwise to position.

$d$ is the bracing or stiffening arm, of which three are in this case shown; but obviously a different number should be used—as, for instance, an eight-slat reel would employ four, and so on. These braces or stiffeners extend across the axis of the reel from one slat to the diametrically opposite one, and besides its attachment at either end by a bolt and nut E to said slats it is secured to the other stiffeners or braces at the center of the reel by a bolt and nut F, which passes through all of the braces, and thereby holds them perfectly rigid and firmly.

What I claim as my invention, and desire to secure by Letters Patent, is—

In a harvester-reel, a shaft having radial arms, reel-fans secured to said arms and extending grainward beyond the said radial arms, a series of stiffening-bars radiating from a common center and wholly independent of the said reel-shaft, said stiffening-bars bolted together at their middles and secured to the overreaching grainward ends of the said reel-fans, substantially as described.

In testimony whereof I have signed my name to this specification in the presence of two subscribing witnesses.

CHARLES A. ANDERSON RAND.

Witnesses:
C. W. SMITH,
EDW. BARRETT.